T. M. FOOTE.
INDICATING AND RECORDING MECHANISM.
APPLICATION FILED MAY 2, 1910.

974,562.

Patented Nov. 1, 1910.

WITNESSES:

INVENTOR
Theodore M. Foote
BY
ATTORNEYS

UNITED STATES PATENT OFFICE.

THEODORE M. FOOTE, OF ALLSTON, MASSACHUSETTS.

INDICATING AND RECORDING MECHANISM.

974,562.  Specification of Letters Patent.  Patented Nov. 1, 1910.

Application filed May 2, 1910. Serial No. 558,779.

*To all whom it may concern:*

Be it known that I, THEODORE M. FOOTE, a citizen of the United States of America, and a resident of Allston, county of Suffolk, and State of Massachusetts, have invented certain new and useful Improvements in Indicating and Recording Mechanism, of which the following is a specification, reference being had to the accompanying drawings, forming a part thereof.

My invention relates to improvements in indicating and recording mechanism, and particularly to means employed in connection with signal lights for indicating whether or not the lights are burning, and for recording the periods during which they are or are not burning. To this end I employ a thermostat in proximity to the light or lights arranged to control an electric circuit in which is contained an electrically controlled indicating device, or an electrically controlled recording means, or both. The indicating device may comprise a simple form of shutter, moved electromagnetically, from one position to another, while the recording means in the preferred form of my invention comprises a traveling strip arranged to travel at a predetermined rate of speed, and having periods of time indicated thereon initially, or mechanism may be included for printing units of time thereon at intervals while the strip is traveling, and a scriber for making a mark upon the strip, the said scriber being electrically operated by means contained in the thermostatically controlled circuit. It will, of course, be apparent that mechanism of this character may be employed for indicating and recording the burning of lights for many purposes and in many locations, but one of the uses for which it is particularly adapted is the indicating and recording of the burning of the port and starboard signal lights of vessels, and it will be noted that by reason of the fact that the heat of the burning light is the controlling factor, it may equally be employed in connection with oil lamps, electric lights, and other lights of whatsoever nature.

I will now proceed to describe a mechanism constituting an embodiment of my invention, having reference to the accompanying drawings illustrating the same, and will then point out the novel features in claims.

Figure 1:
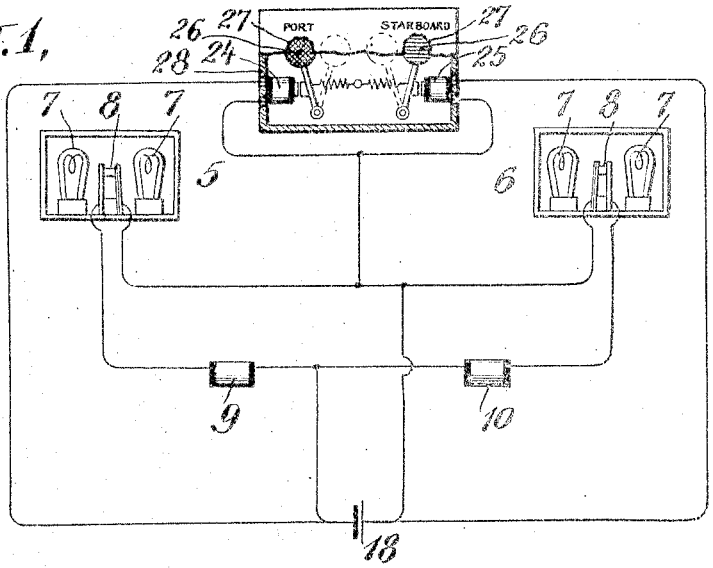
Figure 2:
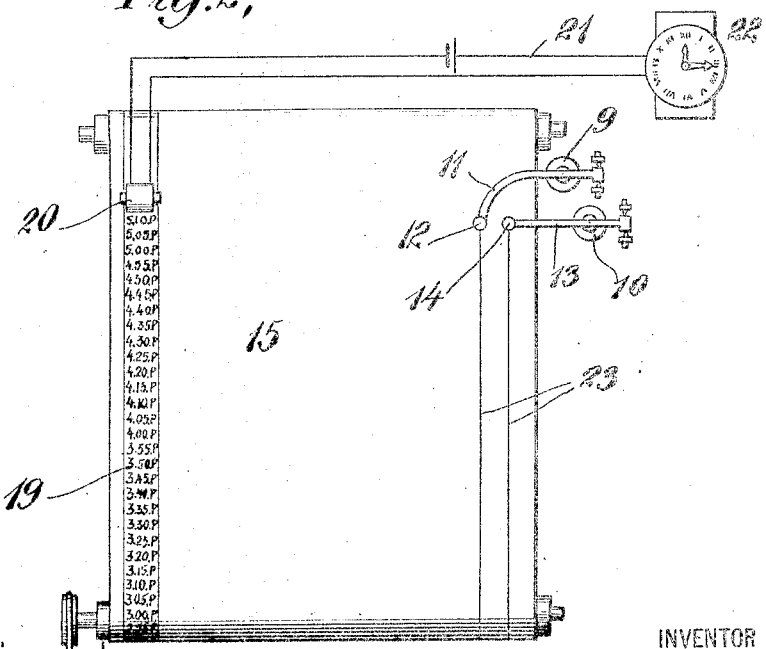

In the drawings: Figure 1 is a diagrammatic view of a recording and indicating mechanism constructed in accordance with my invention, showing particularly the electric circuits therefor. Fig. 2 is a face view in detail of one form of the recording mechanism.

Referring first of all to Fig. 1—5 and 6 indicate two signal lights which may be the port and starboard lights of a vessel. Each of the lights includes two electric bulbs 7—7, though as above stated, other forms of lights or lamps may be employed in lieu thereof. Between each pair of lamps is a thermostatic circuit controller 8, adapted to move from a position to open, to a position to close, circuit under variations in heat resulting from the lamps burning or not burning. The thermostatic circuit controller 8 of the lamp 5 is arranged to control a circuit having therein an electromagnet 9, while the thermostatic circuit controller 8 of the signal light 6 is arranged to control a circuit in which is contained an electromagnet 10. These circuits derive their currents from a generator 18. The electromagnet 9 is provided with an armature 11 the lever of which carries a scriber 12, while the lever of the armature 13 of the electromagnet 10 carries at the end thereof a scriber 14. These two scribers are arranged in proximity to the face of a traveling record strip 15, the same being driven at a predetermined rate of speed by means of suitable driving mechanism (not shown) connected to a roller 16 in engagement with the said strip, a portion of a belt 17 being shown as a means by which power may be transmitted thereto. The scribers are arranged in such proximity to the face of the traveling strip that they will engage the strip to make a mark thereon when circuit is closed through their respective magnets, while when circuit is broken therethrough, the armatures, in moving away from the magnets, will move the scribers out of contact with the strip so that under such conditions no mark will be made thereby upon the said strip. The strip 15 is shown as having time indications 19 upon the face thereof. These indications may appear upon the strip initially, provided the strip travels at a rate of speed proportional thereto, but as it is quite difficult to cause a strip to travel so accurately, I preferably employ a plain strip and print these time indications thereon by means of an ordinary electrically operated time stamp 20, the circuit 21 for which is controlled by a clock 22 or other suitable time train mechanism. By comparing the position of the lines or marks 23 made by the scribers 12 and 14 with respect to the time indications 19, the periods during which the lights are burning can be readily determined. The strip 15, with its marks, while constituting a permanent record, can itself be used as an indicating device to indicate to the observer at all times the condition of the lights, but as in many cases it is desirable that the recording machine be located in a position wherein it cannot ordinarily be observed, I conveniently employ an independent indicator in addition thereto, and indeed, I may, if desired, employ a plurality of such indicators located at different points.

In Fig. 1 I have shown an indicating means for each of the lights 5 and 6, comprising electromagnets 24 and 25, the former being arranged in a branch of the circuit controlled by the thermostatic circuit controller of the lamp 5, and the latter in a branch of the circuit controlled by the thermostatic circuit controller of the lamp 6. The armature lever for each electromagnet is provided with a disk 26 or other indicating element which, in the construction shown, is arranged to appear behind an opening 27 in a casing 28 when the lights are burning and circuit is closed through the said electromagnets, and to move to a position (as shown in dotted lines in Fig. 1) out of register with the said openings 27 when the lights cease to burn and circuit is thereby broken through the said electromagnets.

As above stated, the foregoing mechanism is particularly adapted for indicating and recording the burning of port and starboard lights on board ship. The signal light 5 may be considered to be the port light of a vessel and the signal light 6 the starboard light. The indicators may be similarly marked "Port" and "Starboard", and the marks made by the scribers 12 and 14 will similarly record the burning of the port and starboard lights respectively. In this case the recording mechanism, as a whole, may be placed in any convenient part on board ship where it will be out of the way, and not likely to be tampered with, while the indicating device may be located in a prominent position where an indication of the failure of either of the lights will be readily noticed.

In the broad aspect of my invention it will, of course, be understood that the means operated by the thermostat in proximity to the signal light may be either a recorder or an indicator,—considering the terms in their restricted sense as means for making a permanent record or a temporary indication,— or both such devices may be employed. Either of such devices is, however, a denoting means in that either denotes to an observer the fact whether or not the light is burning at the time, the one by the visually observed position of one of its parts, and the other by a mark or symbol made thereby.

What I claim is:

1. Signal recording mechanism comprising means, thermostatically controlled, for recording the burning of a light.

2. Signal recording mechanism comprising a recording element and thermostatically operated controlling means therefor disposed in proximity to a light, the burning of which is to be recorded.

3. Signal recording and indicating mechanism comprising an electric circuit, a thermostatic circuit controller arranged in close proximity to a light, and independent indicating and recording means in the said electric circuit.

4. Signal recording mechanism comprising an electrically controlled recording element and a thermostatically operated circuit controller therefor.

5. Signal recording and indicating mechanism comprising electrically controlled recording and indicating elements and a thermostatically operated circuit controller therefor.

6. Signal recording and indicating mechanism comprising a thermostatic circuit controller, arranged in proximity to a light, the burning of which is to be recorded, an electromagnet controlled by the said circuit controller, a recording element controlled by the said electromagnet, another electromagnet controlled by the said circuit controller, and an indicating element controlled by the latter said electromagnet.

7. Signal recording mechanism comprising a thermostatic circuit controller arranged in proximity to a light, the burning of which is to be recorded, an electromagnet controlled by the said circuit controller, and a recording element controlled by the said electromagnet.

8. Means for indicating and recording the burning of the port and starboard lights upon a vessel, comprising indicating and recording mechanism, and thermostatically operated means arranged in proximity to the said lights, for controlling the operation of the said indicating and recording mechanism.

9. Means for recording the burning of the port and starboard lights upon a vessel comprising recording mechanism, and thermostatically operated means arranged in proximity to the said lights, for controlling the operation of the said recording mechanism.

10. Signal recording and indicating mechanism comprising indicating and recording means, and means controlled by the burning of a light for operating the same.

11. Signal recording mechanism comprising a recording element, and means controlled by the burning of a light for operating the same.

THEODORE M. FOOTE.

Witnesses:
E. EDNA SPRY,
THOMAS B. BOOTH.